United States Patent [19]
Williams et al.

[11] Patent Number: 5,237,179
[45] Date of Patent: Aug. 17, 1993

[54] APPARATUS FOR OPERATION OF A SCINTILLATION DETECTOR

[75] Inventors: John J. Williams, Hartland, Wis.; John E. R. Watkiss, Bishops Stortford, England; Lars M. Pedersen, Horsholm, Denmark

[73] Assignee: General Electric Company, Milwaukee, Wis.

[21] Appl. No.: 862,948

[22] Filed: Apr. 3, 1992

[30] Foreign Application Priority Data

Apr. 12, 1991 [GB] United Kingdom ............ 9107798

[51] Int. Cl.⁵ .................................. G01T 1/164
[52] U.S. Cl. ..................... 250/363.02; 250/363.01
[58] Field of Search ................ 250/362.01, 362.02, 250/361 R

[56] References Cited

U.S. PATENT DOCUMENTS 3,858,050 12/1974 Carlson ........................ 250/361
4,396,859 8/1983 Butterwick .................. 313/240

Primary Examiner—Carolyn E. Fields
Attorney, Agent, or Firm—James O. Skarsten

[57] ABSTRACT

An assembly is provided for improving operation of a radiation detection system which comprises a scintillation crystal 1, a photomultiplier tube 5 having a cathode maintained at a high negative voltage, a glass wall 3 positioned between the crystal and the tube, and structure 7 supporting the tube to receive a light signal from the crystal representing radiation received thereby. The assembly includes structure 4, 11 for applying the same high negative voltage to the crystal 1, and further includes structure 10 for electrically isolating the supporting structure 7 from the crystal 1 and glass wall 3, the supporting structure 7 being maintained at ground potential.

8 Claims, 2 Drawing Sheets

APPARATUS FOR OPERATION OF A SCINTILLATION DETECTOR

BACKGROUND OF THE INVENTION

The present invention relates to scintillation detectors. The present invention also relates to a method of operation of a scintillation detector. Whilst the principles of the present invention are applicable to scintillation detectors for various applications, an illustrative embodiment of the invention relates to an assembly including a scintillation crystal for use in a gamma camera for nuclear medicine.

For ease of understanding the present invention and its background it will be illustratively described in relation to a gamma camera.

A gamma camera, also known as an Anger camera, is used to produce a medical diagnostic image. A radioactive substance emitting gamma radiation is injected into a subject to be imaged. The gamma radiation is sensed by a scintillation crystal combined with photomultiplier tubes. The tubes convert scintillation events of visible light into electrical signals which are processed to produce the image.

For a better understanding of the background to the present invention, reference will now be made to FIGS. 1 and 2 which are partial sectional views of parts of known gamma cameras, each section being taken in a plane through an axis (A) of symmetry of the part.

Referring to FIG. 1 a scintillation crystal 1, of sodium iodide is hermetically sealed in a protective enclosure 2 because the crystal is very hygroscopic and fragile. The enclosure 2 comprises a wall of light transmissive and electrically insulative material 3, and a metal cap 4, typically an aluminium cap, which is sealed to the wall 3 by e.g. epoxy resin 6.

The wall 3, in this example is of glass, preferably Pyrex (trade name) glass or the like. Pyrex is a heat resistant borosilicate glass.

An array of photomultiplier tubes 5 are supported by the glass wall. Optical couplant (not shown) is provided between the faces of the tubes 5 and the glass wall 3. Light from scintillation events within the crystal 1 is coupled to the array of tubes 5 by the glass wall.

The enclosure 2 and the tubes 5 are supported by a support structure 7 also known as a 'tub'. The tub 7, in addition to supporting the enclosure 2 and tubes 5, shields them from stray radiation and from substantially all light. Typically the tub 7 is of a Lead/Aluminium alloy.

In an alternative structure shown in FIG. 2, an enclosure 2' comprises a steel frame 8 to which the glass wall 3 and aluminium cap 4 are sealed by sealant 6. The cap may also be fixed to the frame e.g. by metal screws. The steel frame makes the enclosure 2' more robust and provides a means for lifting the enclosure in and out of the tub 7 by e.g. fixing lifting bolts (not shown) to the frame 8. The frame 8 is supported by the tub 7.

In the cameras of FIGS. 1 and 2, the photomultiplier tubes are operated with their cathodes at a negative high potential (—HV) relative to their anodes which are grounded. The tub 7, cap 4, and the frame 8, are grounded for safety.

An unexpected problem which has arisen with the cameras of FIGS. 1 and 2 is the occurrence of unwanted scintillations detected by the tubes 5 as background to true scintillation events. As far as is known at present by the inventors, nothing has previously been written about this phenomenon.

SUMMARY OF THE INVENTION

According to one aspect of the present invention, there is provided an assembly for detecting scintillations, the assembly including a scintillation crystal which is hermetically sealed in an enclosure at least one wall of which is formed by an electrically insulative light transmissive material for optically coupling the crystal to light detection means for detecting scintillation of the crystal, a support structure for the enclosure of the crystal, the support structure being of electrically conductive material and, in use, being electrically grounded, and means for at least reducing the potential difference otherwise present across the wall of light transmissive material.

It is believed that the unwanted scintillations are caused by potential gradients across the wall. Reducing or eliminating the potential gradients reduces or eliminates the unwanted scintillations.

In another embodiment a potential is applied to, or adjacent to, the side of the wall remote from the light detector means, which potential is equal to the potential at the light detection means.

In a preferred embodiment of the invention, the wall is of glass e.g. Pyrex glass, light detection means in the form of photomultiplier tubes are provided, and the crystal is in an hermetic enclosure comprising the glass wall to which an aluminium cap is sealed.

DETAILED DESCRIPTION OF THE PREFERRED EMBODIMENT

Investigations by the inventors have revealed that the unwanted scintillations occur in the glass 3 when biased by the potential difference of —HV relative to ground produced across the glass wall 3 by the cathodes of the tubes 5. For reasons not presently understood, the scintillations do not occur in all samples of glass nor even in all samples of the same type of glass.

In the embodiment, the wall is electrically arranged to be at or near the same potential as the cathodes of the photomultiplier tubes so that the potential difference across the glass wall is reduced or removed. Preferably the aluminium cap is electrically coupled to the same potential (—HV) as the cathodes. In such an embodiment, the aluminium cap is covered by a sheet of electrically insulative material.

According to another aspect of the present invention, there is provided a method of reducing unwanted scintillation in an assembly having a scintillation crystal hermetically sealed in an enclosure one wall of which comprises glass on which an array of photomultiplier tubes are arranged, the method comprising reducing the potential difference otherwise present across the said one wall.

According to a further aspect of the present invention, there is provided an assembly for detecting scintillations, the assembly including a scintillation crystal which is hermetically sealed in an enclosure at least one wall of which is formed by an electrically insulative light transmissive material for optically coupling the crystal to light detection means for detecting scintillation of the crystal, a support structure for the enclosure, the support structure being of electrically conductive material and, in use, being electrically grounded, and means which electrically isolate at least the said one wall of the enclosure from at least the support structure.

Isolating the wall, or preferably the entire enclosure, from ground reduces or eliminates undesirable leakage currents which may result in the migration of ions into the light detector means which ions may substantially reduce the light of the light detector means. Reducing the potential difference across the crystal and isolating the crystal from ground reduces the leakage currents.

Figure 2:
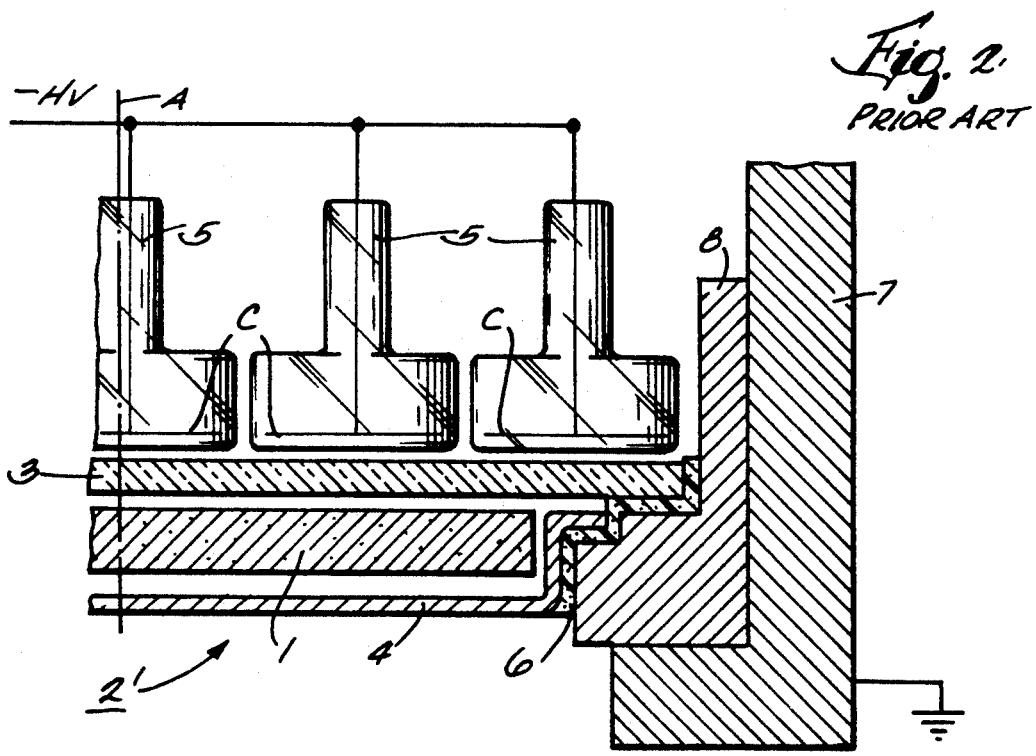
Figure 3:
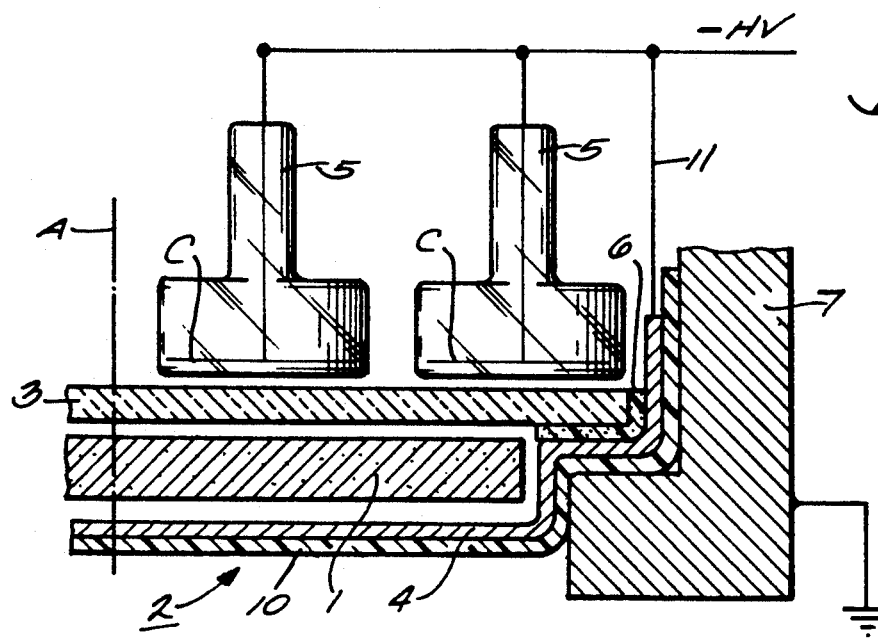
FIGS. 3 and 4 are partial sectional views showing embodiments of the invention used in connection with the gamma cameras of FIGS. 1 and 2, respectively.
Figure 4:
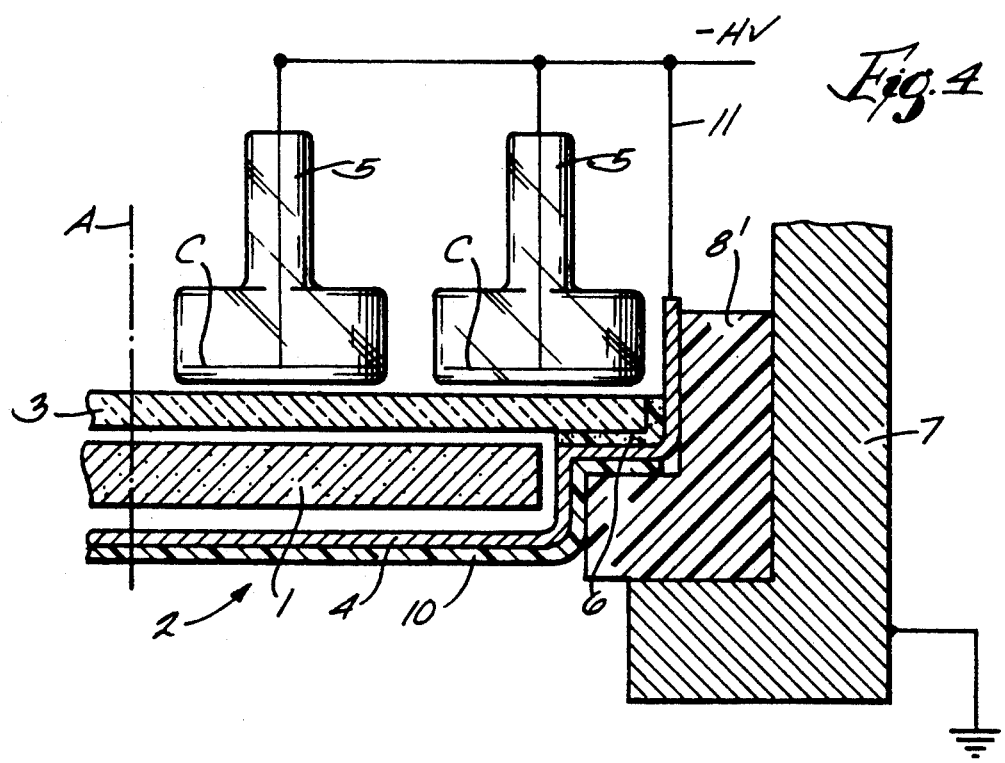

For a better understanding of the present invention, reference will now be made, by way of example, to FIGS. 3 and 4 of the drawings which show partial sectional views in a plane through an axis of symmetry of different embodiments of gamma cameras according to the present invention. In FIGS. 3 and 4, the reference numerals indicate the same parts as in FIGS. 1 and 2.

Referring to FIG. 3, the hermetic enclosure 2 containing the crystal 1 comprises the glass wall 3 to which the aluminium cap 4 is sealed by epoxy resin 6. The enclosure 2 is supported by the tub 7. In this example the glass is Pyrex (trade name) or the like which is a heat resistant borosilicate glass.

In accordance with the embodiment of the invention shown in FIG. 3, a sheet of electrically insulative material 10 is provided covering the cap 4 and extending between the cap 4 and the tub thereby insulating the enclosure 2 from the grounded tub 7 and the cap 4 is connected by a lead 11 to the potential (—HV) of the cathodes of the photomultiplier tubes 5.

Preferably the material 10 is of black, opaque, LEXAN (Trade Mark). A sheet of LEXAN may be vacuum formed to a shape matching that of the cap 4. LEXAN is very tough and provides additional protection for the delicate crystal 1. The sheet 10 is black and opaque to prevent light from being conducted into the tub 7.

Figure 1:
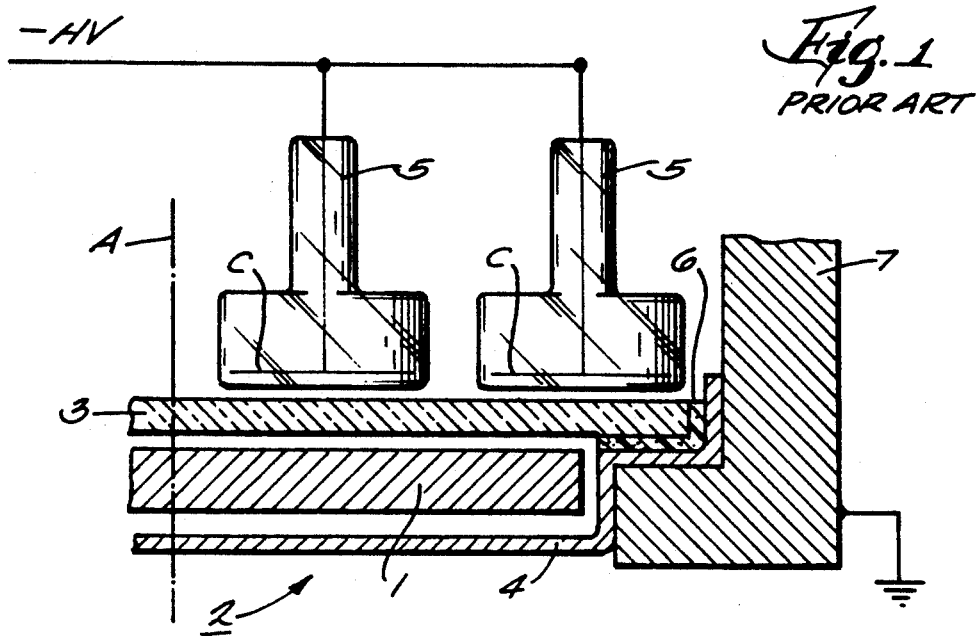
FIGS. 1 and 2 are partial sectional views showing portions of variations of prior-art gamma cameras.

Referring to FIG. 4, an hermetic enclosure 2 similar to that of FIGS. 1 or 3 is provided. The enclosure 2 of FIG. 4 is supported in a frame 8' which is of plastic. Thus the frame 8' provides support whilst the enclosure 2 separately provides the hermetic sealing of the crystal 1. The frame 8' also provides electrical isolation of the enclosure 2 from the grounded tub 7.

The aluminium cap 4 is covered by sheet 10' of electrically insulative material e.g. vacuum formed LEXAN which extends over the face of the cap and between the cap and the frame 8' as shown. The sheet 10' is black and opaque to prevent light from being conducted into the tub 7. Likewise the frame 8' is of material which does not conduct light into the tub.

The aluminium cap is connected by a lead 11 to the operating potential (—HV) of the cathodes of the photomultiplier tubes 5.

It has been found that in the embodiments of FIGS. 3 and 4 reducing or eliminating the potential difference across the glass at least reduces and may eliminate the unwanted scintillation. In addition by reducing or eliminating the potential difference between the cathodes of the photomultiplier tubes 5 and the enclosure 2 and/or by isolating the enclosure from ground, leakage currents into the tubes are reduced or eliminated. Such leakage currents allow the unwanted migration of ions into the tubes 5. The ions can poison the tubes substantially reducing the lives of the tubes.

Whilst the invention has been described by way of example in relation to gamma cameras for nuclear medicine, the principles of the invention may be applied to any form of scintillation detector especially planar scintillation detectors.

What is claimed is:

1. In a radiation detection system comprising a scintillation crystal, a photomultiplier tube, means for maintaining the tube cathode at a high negative voltage, a glass wall positioned between the crystal and the tube, and a structure supporting the tube to receive a light signal from the crystal representing radiation received thereby, an assembly for improving operation of the radiation detection system comprising:
    means for applying said high negative voltage to said crystal;
    means for electrically isolating said supporting structure from said high voltage applied to said crystal and said cathode; and
    means for maintaining said supporting structure at ground potential.

2. The assembly of claim 1 wherein:
    said voltage applying means further comprises means for applying said high voltage to a first region substantially surrounding said crystal and extending around the edge of said glass wall, said voltage applying means being configured to avoid blocking an optical path for said light signal extending from said crystal to said tube cathode and through said glass wall; and
    said isolating means further comprises means for electrically isolating a second region proximate to said first region from said high voltage.

3. The assembly of claim 2 wherein:
    said voltage applying means applies said high voltage to said glass wall; and
    said isolating means comprises first means for electrically isolating said supporting structure from said glass wall, and a second means for electrically isolating said second region from said crystal.

4. The assembly of claim 3 wherein:
    said first means comprises a layer of electrically insulative material positioned between the first and second regions; and
    said second means comprises a frame of electrically insulative material positioned between said wall and said supporting structure.

5. The assembly of claim 3 wherein:
    the anode of said photomultiplier tube is operated at ground potential.

6. The assembly of claim 3 wherein said voltage applying means comprises:
    a structure formed of conductive material extending across the side of said crystal opposite from said glass wall, said conductive structure having an upper edge extending between said supporting structure and the edges of said crystal and said glass wall; and
    an electrically conductive lead connecting said conductive structure to a source of high negative voltage which is also connected to said tube cathode.

7. The assembly of claim 6 wherein:
    said isolating means comprises a sheet of electrically insulated material covering said conductive structure and extending between said conductive structure and said supporting structure.

8. The assembly of claim 7 wherein:
said photomultiplier tube is included in an array of photomultiplier tubes, all of said tubes being supported by said supporting structure; and
said sheet of electrically insulative material comprises means for transmitting a force between said array and said supporting structure which is at least equal to the weight of said array.

* * * * *